(12) United States Patent
Kanamori et al.

(10) Patent No.: US 7,956,561 B2
(45) Date of Patent: Jun. 7, 2011

(54) ROTOR POSITION SENSING SYSTEM OF BRUSHLESS MOTOR

(75) Inventors: Atsushi Kanamori, Nukata-gun (JP); Satoshi Yoshimura, Kariya (JP)

(73) Assignee: DENSO CORPORATION, Kariya (JP)

(*) Notice: Subject to any disclaimer, the term of this patent is extended or adjusted under 35 U.S.C. 154(b) by 565 days.

(21) Appl. No.: 12/153,030

(22) Filed: May 13, 2008

(65) Prior Publication Data

US 2008/0297079 A1    Dec. 4, 2008

(30) Foreign Application Priority Data

May 28, 2007 (JP) ................................ 2007-140366
Nov. 7, 2007 (JP) ................................ 2007-289855

(51) Int. Cl.
*H02P 6/06* (2006.01)
(52) U.S. Cl. ........... 318/400.06; 318/400.34; 318/254.1; 318/268
(58) Field of Classification Search ............. 318/400.06, 318/400.34, 400.04, 400.05, 254.1, 268, 318/459
See application file for complete search history.

(56) References Cited

U.S. PATENT DOCUMENTS

| 4,743,815 | A | * | 5/1988 | Gee et al. ................. | 318/400.11 |
| 4,888,533 | A | * | 12/1989 | Gotoh et al. ................ | 318/524 |
| 4,978,895 | A | * | 12/1990 | Schwarz ................... | 318/400.04 |
| 5,198,733 | A | * | 3/1993 | Wright ..................... | 318/400.34 |
| 5,640,073 | A | * | 6/1997 | Ikeda et al. .............. | 318/400.03 |
| 5,923,134 | A | * | 7/1999 | Takekawa ................. | 318/400.01 |
| 6,128,436 | A | * | 10/2000 | Bos et al. ................. | 388/815 |

FOREIGN PATENT DOCUMENTS

| JP | A-S62-123979 | 6/1987 |
| JP | A-H7-288992 | 10/1995 |
| JP | A-H9-266690 | 10/1997 |
| JP | A-2003-102193 | 4/2003 |
| JP | A-2004-304905 | 10/2004 |
| JP | A-2004-350348 | 12/2004 |

OTHER PUBLICATIONS

Chinese First Office Action dated Apr. 14, 2010 issued from the Chinese Patent Office in the corresponding Chinese patent application No. 2008101093351 (with English translation).
Office Action mailed on Mar. 10, 2009 issued from the Japanese Patent Office in the corresponding Japanese patent application No. 2007-289855 (and English translation).

* cited by examiner

*Primary Examiner* — Walter Benson
*Assistant Examiner* — Thai Dinh
(74) *Attorney, Agent, or Firm* — Posz Law Group, PLC

(57) ABSTRACT

A rotor position detecting circuit includes a first position detecting circuit having a low-pass filter that shapes up phase voltage induced in a phase coil and a first comparator that compares the output voltage of the low-pass filter with a threshold level to form a first rotor position signal, and a second position detecting circuit having a second comparator that compares the phase voltage with a threshold voltage and a control unit that digitally processes the output voltage of the second comparator to form a second rotor position signal. The control unit corrects the first rotor position signal by the second rotor position signal to provide a final rotor position signal when the rotation speed of the brushless DC motor is in a measurable range.

17 Claims, 14 Drawing Sheets

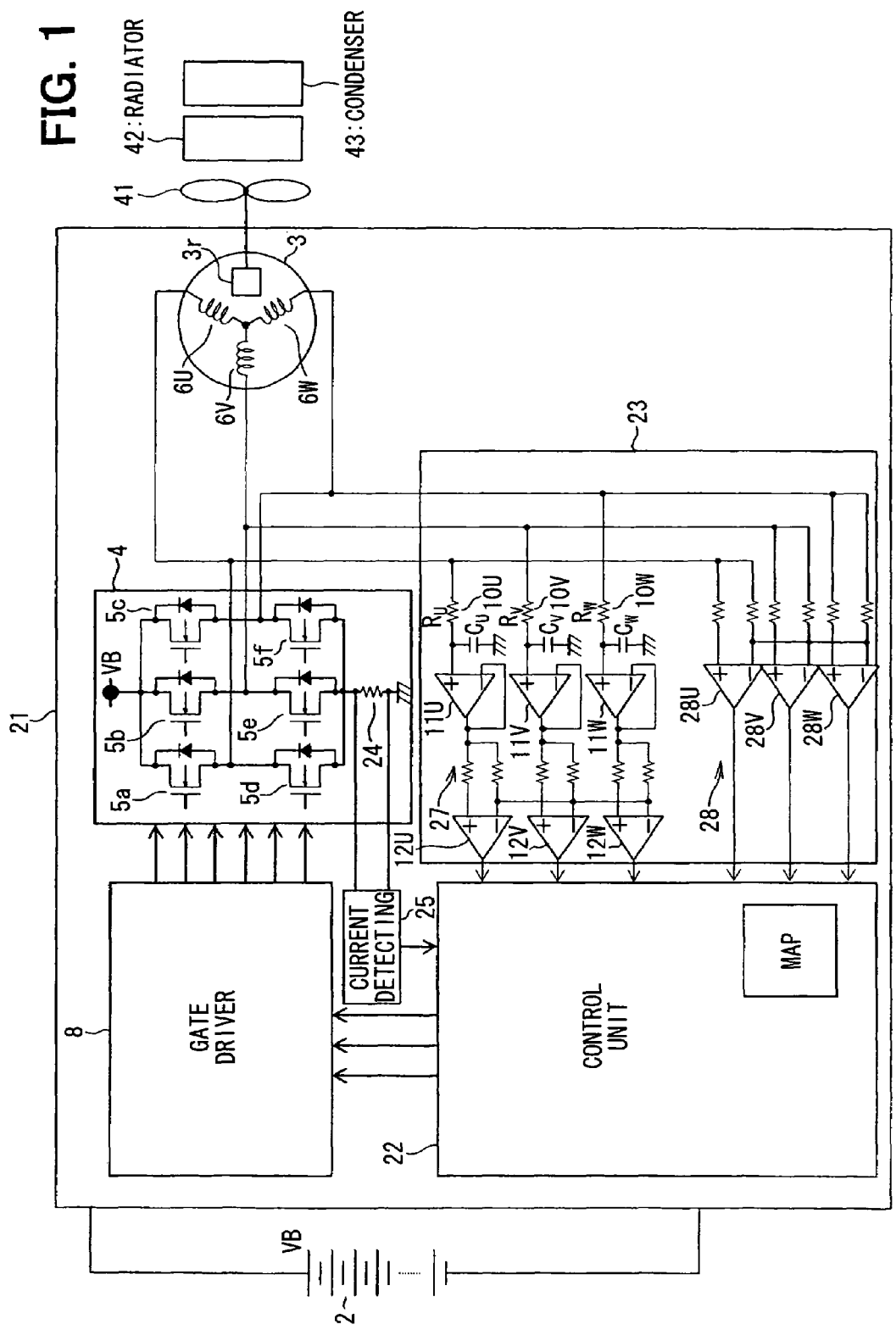

FIG. 2A
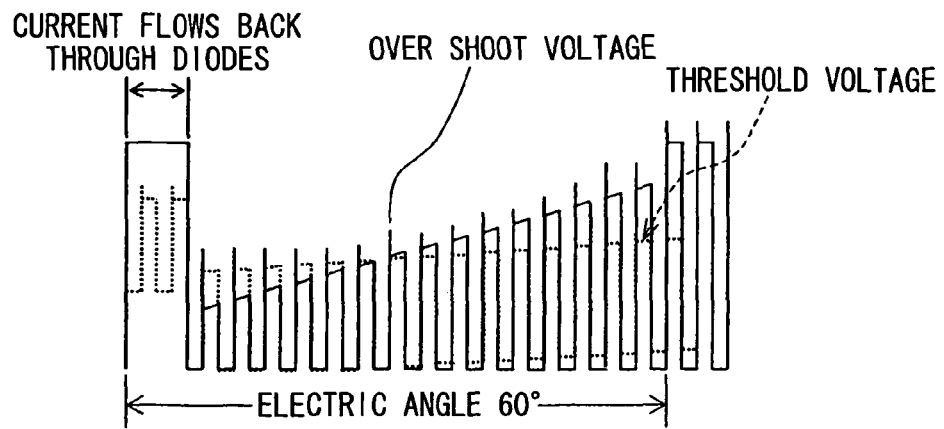
FIG. 2B
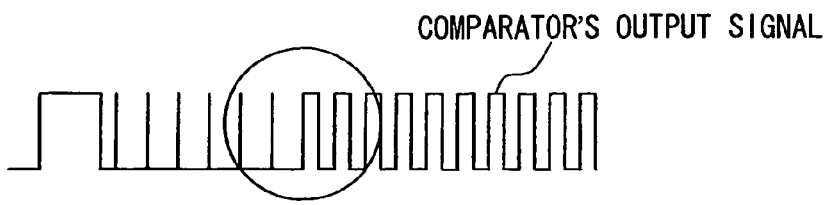
FIG. 2C
FIG. 2D
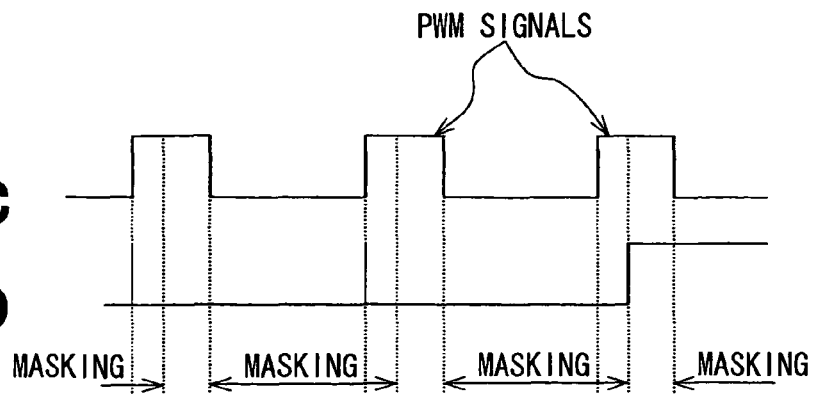

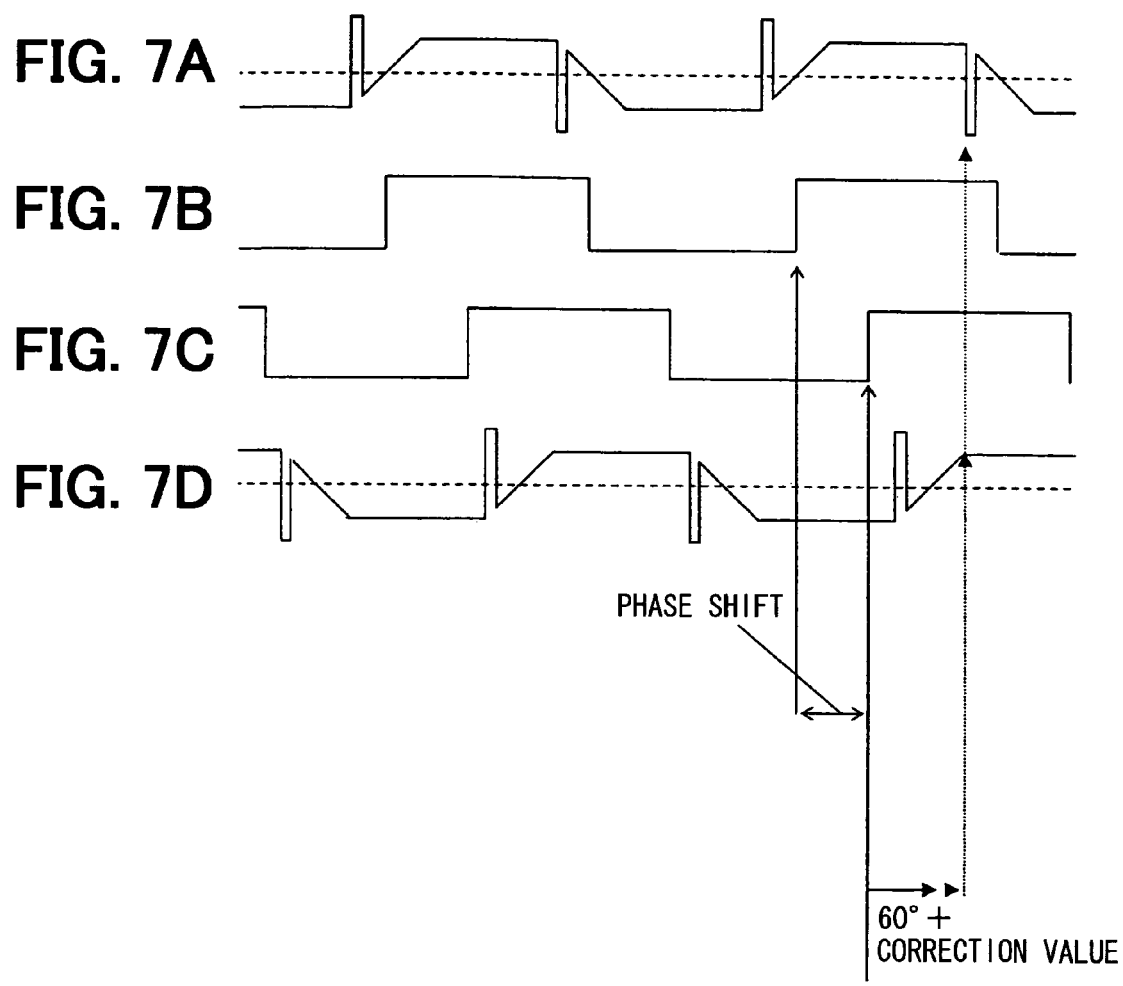

PHASE DELAY

30° DELAY

ROTOR POSITION SENSING SYSTEM OF BRUSHLESS MOTOR

CROSS REFERENCE TO RELATED APPLICATION

The present application is based on and claims priority from Japanese Patent Application 2007-140366, filed May 28, 2007 and Japanese Patent Application 2007-289855, filed Nov. 7, 2007, the contents of which are incorporated herein by reference.

BACKGROUND OF THE INVENTION

1. Field of the Invention

The present invention relates to a brushless motor driving system for driving a brushless DC motor by sensing a rotor position of the rotor thereof, and in particular, a system and a method for sensing a rotor position of a brushless DC motor based on voltage induced in a phase coil of the brushless motor.

2. Description of the Related Art

JP-A-62-123979, JP-A-9-266690 and JP-A-7-288992 respectively disclose brushless DC motor driving system, in which brushless DC motors are operated based on the rotor position of their rotor that is detected by phase voltage induced in stator coils thereof.

The brushless DC motor disclosed in JP-A62-123979 may be used for a blower motor having a cooling fan, as a load, to cool a radiator of an automobile in a similar manner as shown in FIG. 11 of this application. That is, the brushless DC motor driving system includes a brushless DC motor 3, an inverter 4, a control unit 7, a gate driver 8 and a rotor position detecting circuit 9. The inverter 4 is constructed of a three-phase bridge circuit of six power metal oxide semiconductor field-effect transistors (MOSFETs) 5a, 5b, 5c, 5d, 5e and 5f. The inverter 4 has three output terminals respectively connected with three phase coils 6U, 6V, 6W of the DC motor 3. The inverter 4 is controlled by the control unit 7 via the gate driver 8, which provides the gates of the MOSFETs 5a, 5b, 5c, 5d, 5e and 5f with drive signals, so that the inverter outputs PWM signals to the brushless DC motor 3. The rotor position of the rotor of the brushless DC motor 3 is detected by the rotor position detecting circuit 9 and sent to the control unit 7. The rotor position detecting circuit 9 includes three low-pass filters 10U, 10V, 10W, each of which is constructed of a capacitor Cu, Cv or Cw and a resistor Ru, Rv or Rw, three buffer amplifiers 11U, 11V, 11W and three comparators 12U, 12V, 12W. The input terminal of each of the low-pass filters 10U, 10V, 10W is connected to a junction of voltage dividing resistors $R_{1U}$-$R_{2U}$, $R_{1V}$-$R_{2V}$, or $R_{1W}$-$R_{2W}$ which are respectively connected between the output terminals of the inverter 4 and a ground.

When the motor 3 is operated, the control unit 7 gives the inverter electric power of a preset pattern to provide PWM switching signals. When the motor 3 is operated, phase voltage is induced in each of the stator coils 6U, 6V, 6W to be superimposed over PWM switching signals, as shown in FIG. 12A, in which only the voltage waves in U-phase stator coil 6U is shown. The low-pass filters 10U, 10V, 10W remove the switching signals and shapes up the phase voltage to output sinusoidal voltage signals as shown in FIG. 12B. Then, the comparator 12U, 12V and 12W respectively compare the sinusoidal voltage signals with a virtual neutral voltage level and output rectangular rotor position signals, as shown in FIG. 12C.

The control unit 7 is given control signals from an outside electric control unit to control the duty ratio of the PWM switching signals. The control unit 7 also sets switch timing to form the driving signal to be outputted to the gate driver 8.

When the induced voltage passes one of the low-pass filters 10U, 10V, 10W, phase delay increases as the rotation speed of the motor (or the rotor) increases, as shown in FIG. 15B. Although the phase delay becomes stable at the phase delay of 90 degrees if the time constant of the low-pass filters increases as shown in FIG. 15B, the gain of the low-pass filter decreases as the time constant thereof increases, as shown in FIG. 15A. Further, the phase delay changes when the temperature of the low-pass filter, which is usually disposed near the radiator of an automobile, changes. Therefore, it is difficult to control the phase delay to a fixed phase angle, such as 90 degrees.

A brushless DC motor driving system disclosed in JP-A-9-266690 also has a similar rotor position detecting system in construction except that the low-pass filters 10U, 10V, 10W are omitted, as shown in FIG. 13. This control unit detects zero-cross points of the induced voltage waves by comparing the induced voltage with a reference voltage level and provides turn-on timings that are different in phase angle of 30 degrees from each other, as shown in FIG. 14.

However, it is impossible to detect the zero-cross points when the rotation speed of the brushless DC motor becomes higher than a certain level due to current flowing through diodes each of which is connected across one of the MOSFETs of the inverter, as shown in FIG. 16A. It is also impossible to detect the zero-cross points when the phase of the phase signal is advanced by more than 30 degrees in electric angle, as shown in FIG. 16B.

The control unit of a brushless DC motor driving system shown in JP-A-7-288992 detects third-order harmonic wave components by comparing the mechanical neutral point of the motor and a virtual neutral point formed by a resistor circuit, thereby detecting the rotor position of the rotor.

However, it is difficult to apply this system to a system that includes a brushless DC motor having delta-connected phase coils because it is necessary to connect a rotor position detecting circuit with the mechanical neutral point, which does not exist in the motor having the delta-connected phase coils.

SUMMARY OF THE INVENTION

Therefore, an object of the invention is to provide an improved rotor position detecting circuit that can be applied to a brushless DC motor having delta-connected phase coils as well as a brushless DC motor having star-connected phase coils.

Another object of the invention is to provide an improved rotor position detecting circuit that can effectively reduce high-frequency noise generated during PWM switching control.

According to a feature of the invention, a rotor position detecting circuit includes first means for detecting phase voltage induced in one of the phase coils, a first position detecting circuit including a low-pass filter connected to the first means and a first comparator that compares the output voltage of the low-pass filter with a threshold level to form a first rotor position signal, and a second position detecting circuit including a second comparator that compares the phase voltage with a threshold voltage and second means for digitally processing the output voltage of the second comparator to form a second rotor position signal, and third means for correcting the first rotor position signal by the second rotor position signal to provide a final rotor position signal when the rotation speed of the brushless DC motor is in a measurable range.

The first rotor position signal can indicate the rotor position over a rather wide speed range although the rotor position may be inaccurate. On the other hand, the second rotor position signal can indicate accurate rotor position at a limited speed range of the rotor. The above featured invention provides the accurate rotor position signal over a wide speed range by combining the first and second rotor position detecting circuits.

In the above rotor position detecting circuit, the third means may comprise a correction map that stores correction values each of which corresponds to a rotation speed of the brushless DC motor to correct the first position signal by one of the correction values stored in the correction map instead of the second rotor position signal when the rotation speed of the motor is not in the measurable range; the third means may form an approximation based on the second rotor position signal and corrects the first position signal by a correction value calculated from the approximation when the rotation speed of the brushless DC motor is not in the measurable range; fourth means for detecting an amount of current flowing through at least one of the phase coils may be added so that the third means can set the measurable range based on the amount of current; the second position detecting circuit may include a plurality of comparators each of which is connected with one of the phase coils to provide the second rotor position signal for correcting of the first rotor position signal that corresponds to each of the phase coils.

In this rotor position detecting circuit, the third means may correct the first position signal by one of the correction values stored in the correction map when the rotation speed of the brushless DC motor is not between an upper limit of the measurable range and a lower limit of the measurable range.

Therefore, the rotor position of the brushless DC motor can be accurately detected in much wider rotation speed range.

Another object of the invention is to provide an improved brushless DC motor driving system that can be applied to a brushless DC motor having delta-connected phase coils as well as a brushless DC motor having star-connected phase coils.

According to another feature of the invention, a brushless DC motor driving system includes the above-featured rotation position detecting circuit and a motor driving circuit that drives a brushless DC motor at timings provided by the rotation position detecting circuit.

In this brushless DC motor driving system the third means may include phase shift calculating means for calculating a phase shift between the first rotor position signal and the second rotor position signal and turn-on timing setting means for setting a turn-on timing of the motor driving circuit based on a phase of the first rotor position signal. The motor driving circuit may include an inverter connected to the brushless DC motor and a gate driver that drives the inverter. The third means may include a correction map that stores correction values each of which corresponds to a rotation speed of the brushless DC motor. The turn-on timing setting means sets the turn-on timing based on one of the correction values when the rotation speed of the brushless DC motor is not in the measurable range. The turn-on timing setting means may add as n times as many electric angles of 60 degrees to the phase of the first rotor position signal or one of the correction values to set the turn-on timing when n is a natural number.

This brushless DC motor driving system may further include fourth means for detecting an amount of current flowing through at least one of the phase coils. In this case, the third means sets the measurable range based on the amount of current.

Another object of the invention is to provide an improved method of driving a brushless DC motor having a plurality of phase coils.

According to a feature of the invention, a method include picking up phase voltage induced in one of the phase coils, passing the phase voltage through a low-pass filter to provide a wave-shaped phase signal, comparing the wave-shaped signal with a threshold level to provide a first rotor position signal, directly comparing the phase voltage with a threshold level to have an output signal, digitally processing the output signal to provide a second rotor position signal, and correcting the first rotor position signal by the second rotor position signal to provide a final rotor position signal when the rotation speed of the motor is in a measurable range.

This method may further include supplying PWM control signals to the phase coils of the brushless DC motor and storing correction values each of which corresponds to a rotation speed of the brushless DC motor or forming an approximation based on the second rotor position signal. In this case, the first rotor position is corrected by one of the correction values, or the first rotor position is corrected by a correction value calculated from the approximation when the rotation speed of the motor is not in the measurable range.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 1 is a circuit diagram of a brushless DC motor driving system according to the first embodiment of the invention;

FIGS. 2A, 2B, 2C and 2D are graphs showing digital processes carried by a control unit of the motor driving system;

FIGS. 7A, 7B, 7C and 7D are timing diagrams that correspond to the flow diagram shown in FIG. 5;

DETAILED DESCRIPTION OF THE PREFERRED EMBODIMENTS

Figure 3A:
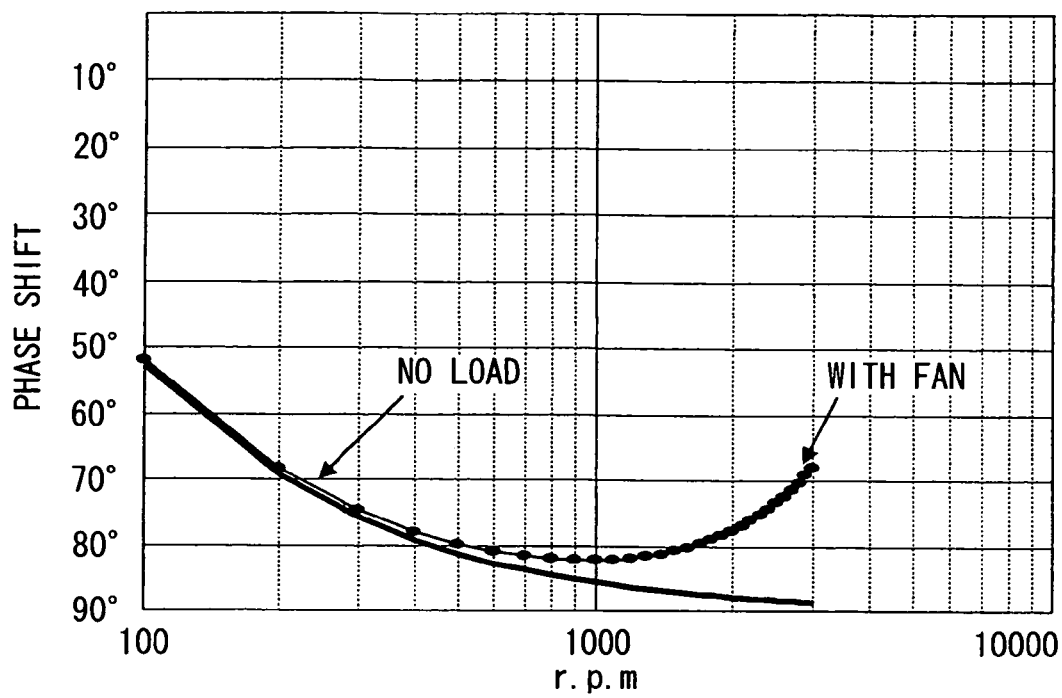
FIGS. 3A, 3B and 3C are graphs showing phase shift when the rotational speed of the DC brushless motor changes.
Figure 3B:
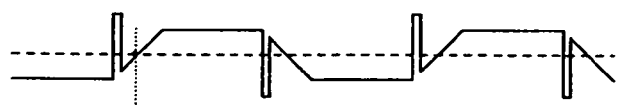
Figure 3C:
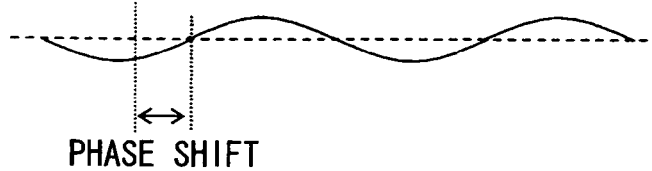

Four preferred embodiments according to the present invention will be described with reference to the appended drawings.

A brushless DC motor driving system 21 according to the first embodiment of the invention will be described with reference to FIGS. 1-7. The brushless DC motor driving system 21 is powered by a battery 2 to drive a cooling fan 41 that supplies cooling air to a radiator 42 of a vehicle engine and a condenser 43 of an air condition system of a vehicle. The brushless DC motor driving system 21 includes a brushless DC motor 3, an inverter 4, a gate driver 8, a control circuit 22, a rotor position detecting circuit 23 and a current detecting circuit 25.

The brushless DC motor 3 has star-connected three phase coils 6U, 6V, 6W. The inverter 4 is constructed of a three-phase bridge circuit of six metal oxide semiconductor field-effect transistors (MOSFETs) 5a, 5b, 5c, 5d, 5e 5f that has three output terminals respectively connected with the three phase coils 6U, 6V, 6W of the DC motor 3 and a shunt resistor 24 that is connected between the sources of the low-side MOSFETs 5d, 5e, 5f and a ground. The shunt resistor 24 is also connected at its opposite ends with a pair of input terminals of the current detecting circuit 25, whose output signal is given to the control unit 22.

The current detecting circuit 25 detects the amount of current flowing through the shunt resistor 24 and sends a signal of the amount of current to the control unit 22. The rotor position detecting circuit 23 includes a first position detecting circuit 27 and a second position detecting circuit 28. The first position detecting circuit 27 includes three low pass filters 10U, 10V, 10W, three buffer amplifiers 11U, 11V, 11W, three first comparators 12U, 12V, 12W, etc. The second position detecting circuit 28 includes three second comparators 28U, 28V, 28W.

Figure 11:
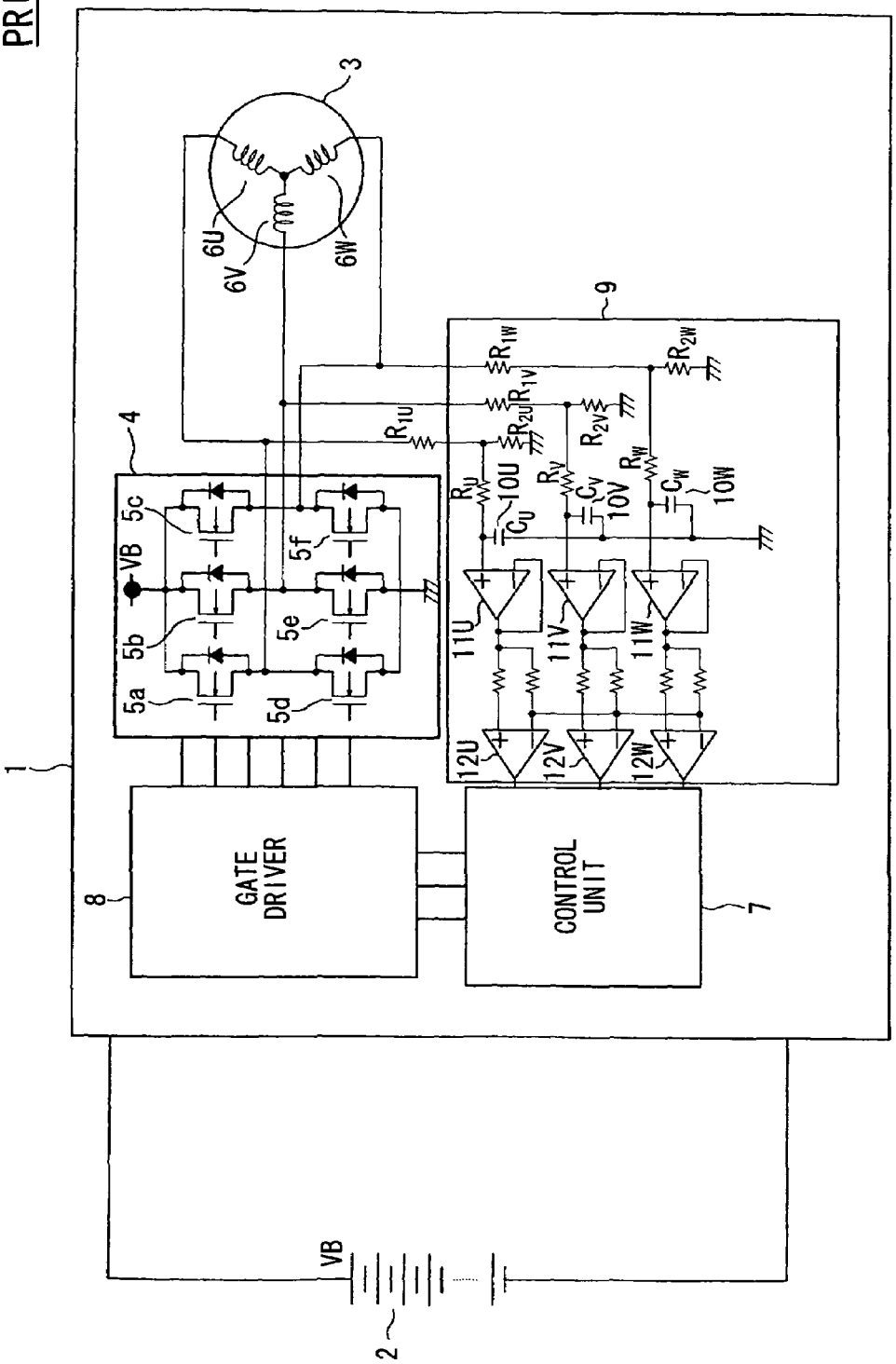
FIG. 11 is a circuit diagram of a prior art brushless DC motor driving system.
Figure 12A:
FIGS. 12A, 12B and 12C are graphs showing phase shift of an induced voltage wave in the prior art brushless DC motor driving system shown in FIG. 11.
Figure 12B:
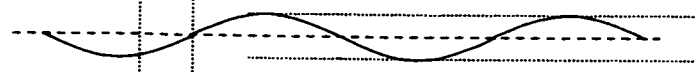
Figure 12C:
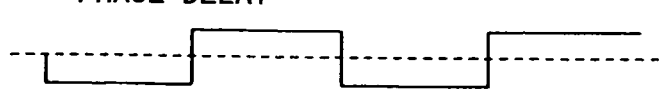
Figure 14A:
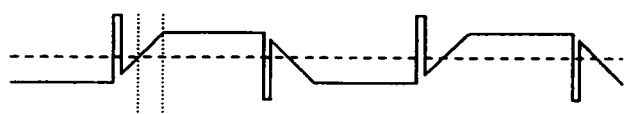
FIGS. 14A, 14B and 14C are graphs showing phase shift of the prior art motor driving system shown in FIG. 13.
Figure 14B:
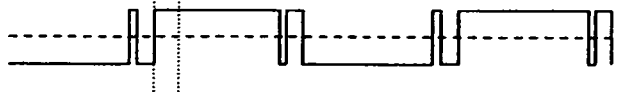
Figure 14C:
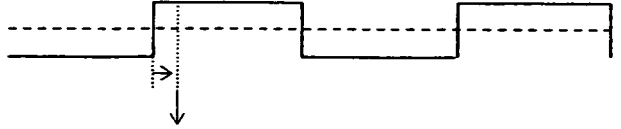
Figure 13:
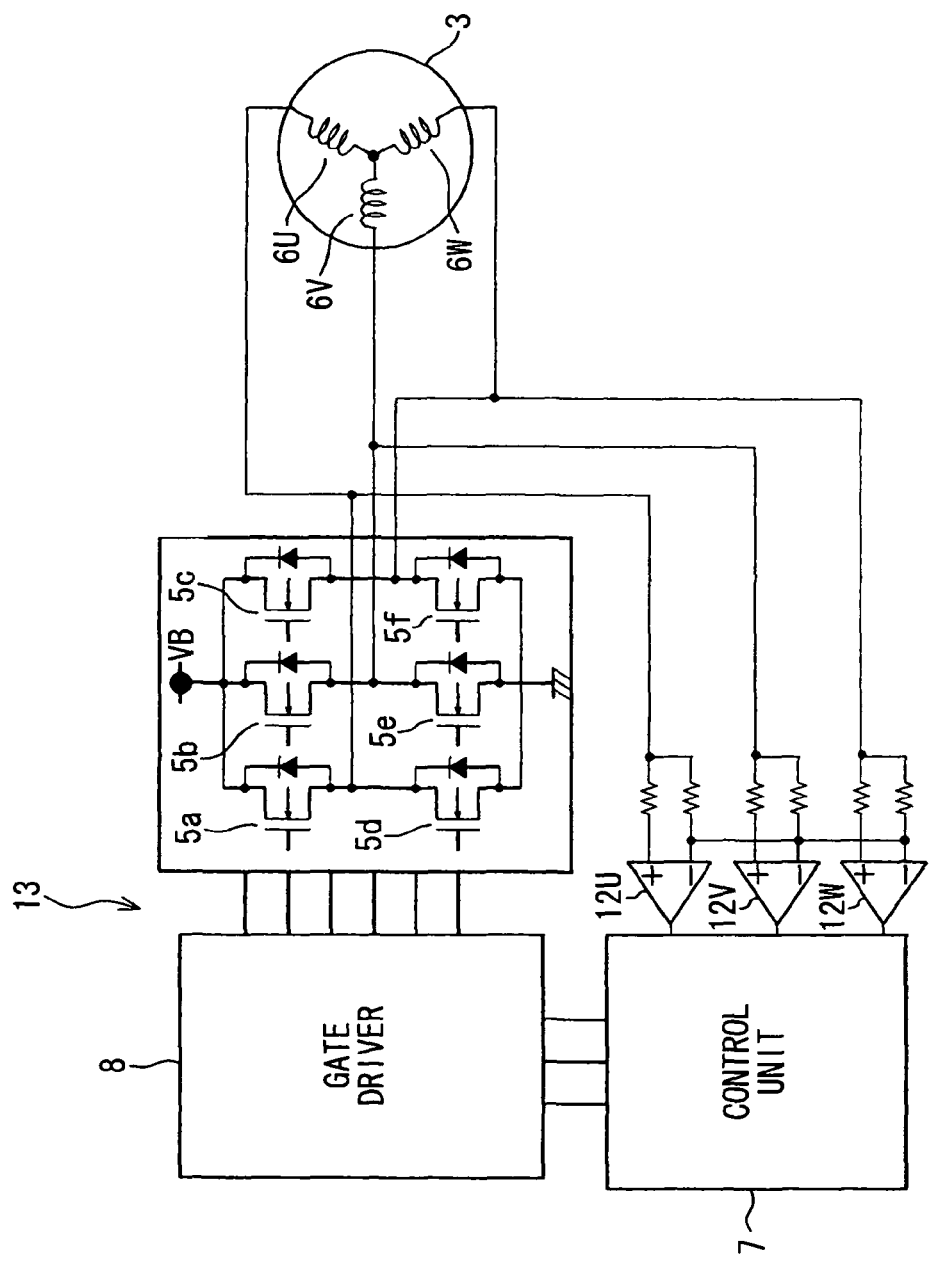
FIG. 13 is a circuit diagram of another prior art brushless DC motor driving system.
Figure 15A:
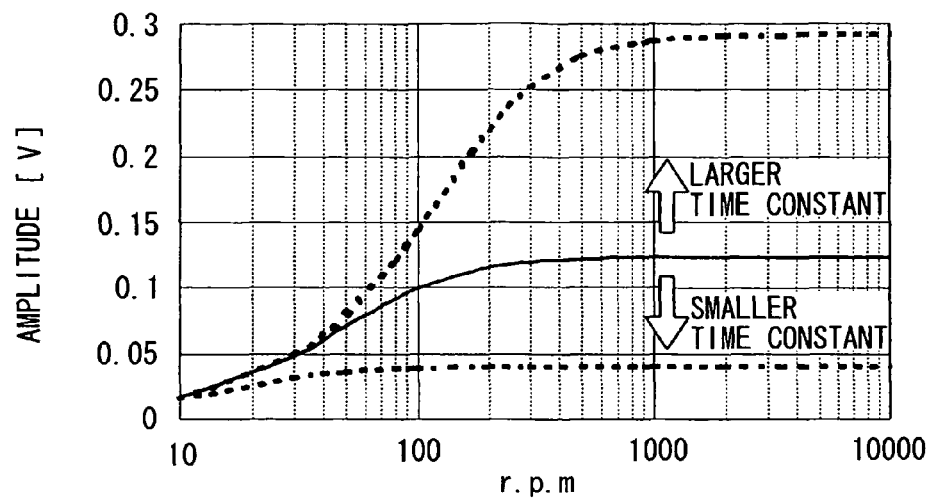
FIGS. 15A and 15B are graphs showing problems when the rotational speed of the prior art brushless DC motor driving system shown in FIG. 11.
Figure 15B:
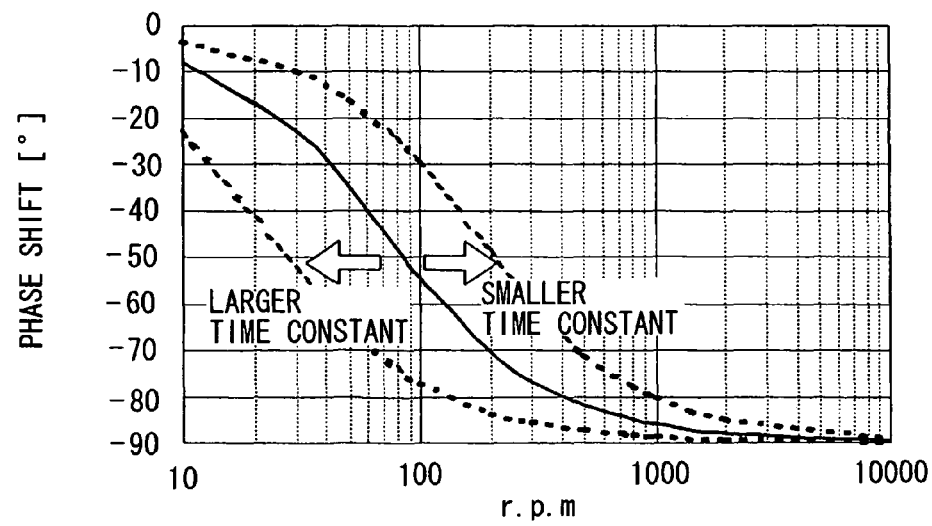
Figure 16A:
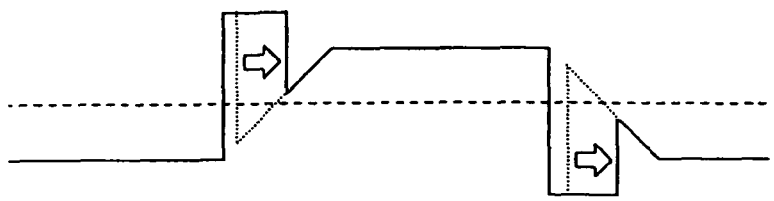
FIGS. 16A and 16B are graphs showing problems when the rotational speed of the prior art motor driving system shown in FIG. 13.
Figure 16B:
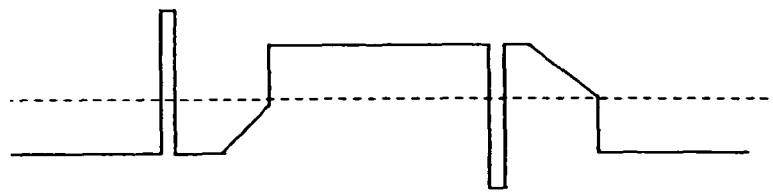

The input terminals of the first comparators 12U, 12V, 12W of the first position detecting circuit 27 are connected with the phase coils 6U, 6V, 6W via the low pass filters 10U, 10V, 10W, voltage dividing resistors (not shown here but shown in FIG. 11) and buffer amplifiers 11U, 11V, 11W. The second comparators 28U, 28V, 28W are connected with the phase coils 6U, 6V, 6W without any circuit therein. The second comparators 28U, 28V, 28W compares the phase voltage of each of the phase coils 6U, 6V, 6W with a virtual neutral voltage level.

The control unit 22 forms a second rotor position signal based on the output signals of the second comparators 28U, 28V, 28W.

As shown in FIG. 2A, each of the input signals of the second comparators 28U, 28V, 28W is phase voltage that has a switching wave shape caused by a pulse width modulation (PWM) signal. The input signals include overshoot voltages generated due to the switching operation. Each of the second comparators 28U, 28V, 28W compares the voltage of the input signal thereof with threshold voltage (neutral voltage) and provides an output signal, as shown in FIG. 2B.

The control unit 22 masks the output signals of the second comparators 28U, 28V, 28W at a period (back-flow period) in which current flows back through the diodes of the MOSFETs 5a, 5b, 5c, 5d, 5e, 5f. The output signals of the second comparators 28U, 28V, 28W are also masked by the control unit 22, in synchronism with the PWM signal, at periods in which the PWM signal falls down until it rises up and at a transient period in which the overshoot voltage is included, as shown in FIG. 2D. Incidentally, FIG. 2C corresponds to the encircled portion II-C of FIG. 2B.

When the motor 3 is operated at a certain low speed range, the duty ratio of the PWM signal becomes so small that the whole portion of the output signals of the second comparators 28U, 28V, 28W are masked. If the carrier frequency is 20 kHz and the masking period is 5 microseconds, the duty ratio that can be detected should be more than 10%.

When, on the other hand, the motor 3 is operated at a certain high speed range, the width of the induced voltage (the width between zero-cross points) becomes too short to be detected. Because the fan load becomes heavier as the rotation speed increases, the back-flow period in which the current flows back through the diode becomes longer. As a result, one of the zero cross points is masked in the back-flow period. If, for example, the motor 3 is driven by a PWM signal whose turn-on period is 120 degrees in angle with the leading angle being 0 degree, the zero-cross point is located at the middle of a 60-degree period. Therefore, the zero-cross point is masked if the back-flow period becomes longer than 30 degrees in electric angle.

When the motor 3 having no load is operated, the phase shift becomes near 90 degrees, as indicated by a thick solid line in FIG. 3A. That is, the phase shift of 90 degrees corresponds to the turn-on timing when the leading angle is 0.

Because the load current increases as the rotation speed increases in case that the load of the motor 3 is a cooling fan 41, the back-flow period increases. Therefore, the charging time of the capacitors of the low-pass filters 10U, 10V, 10W becomes shorter, and the phase shift becomes smaller as the rotation speed increases, as indicated by a thin solid line in FIG. 3A.

Figure 4:
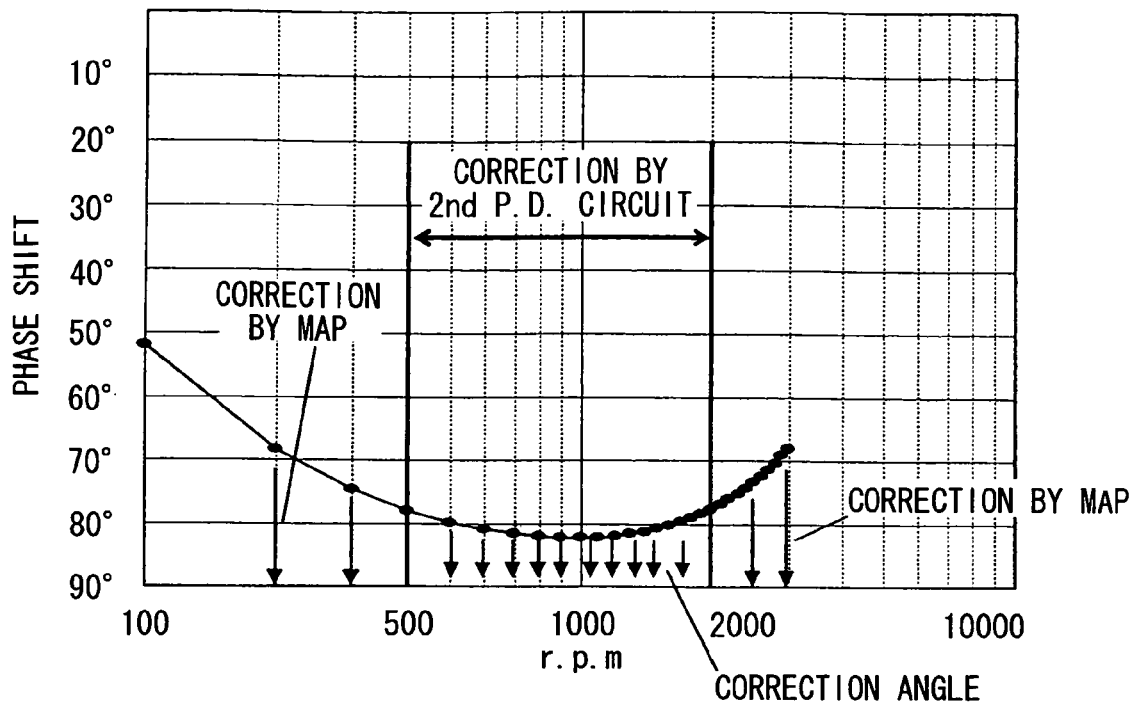
FIG. 4 is a graph showing a range of the rotational speed of the DC brushless motor in which phase correction is made when it drives a cooling fan.

In both a certain low speed range and a certain high speed range, the rotor position can be detected with help of a data table or correction map in which a relation between the rotation speed and the phase shift is stored, as shown in FIG. 4.

The operation of the control unit 22 in which the turn-on signal is formed based on the rising edge of the second rotor position signal will be described with reference to FIGS. 5, 6A-6G and 7A-7D.

Figure 6A:
FIGS. 6A, 6B, 6C, 6D, 6E, 6F and 6G are graphs showing steps of masking the second rotor position signal and the phase correction of a first rotor position signal.
Figure 6B:
Figure 6C:
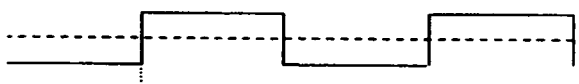

When the control unit 22 detects the rising edge of the masked second rotor position signal that is outputted by the second rotor position detecting circuit 28, shown in FIG. 6C and FIG. 7B, at step S1, it starts a counter Au at S2. These steps are executed separately from the following steps.

Incidentally, the second rotor position detecting circuit 28 provides a U-phase second rotor position signal in FIG. 6B from the U-phase voltage induced in the U-phase coil of the motor 3 shown in FIGS. 6A and 7A.

Figure 6D:
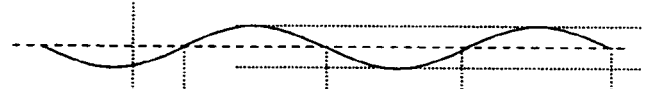
Figure 6E:
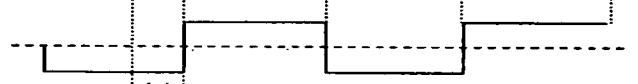

In the meantime, the first rotor position detecting circuit provides a U-phase signal shown in FIG. 6E and FIG. 7C from the output signal of the U-phase low pass filter 10U shown in FIG. 6D when the U-phase signal is induced in the U-phase coil of the motor 3. Incidentally, a V-phase rotor position signal is shown in FIG. 7D.

When the control unit 22 detects the rising edge of the second rotor position signal that is outputted by the first rotor position detecting circuit 27 as shown in FIG. 6E at S3, it stops the counter Au and a counter B at S4. Incidentally, the counter Au detects the interval between the rising edges of the first and second rotor position signals.

The counter B stops when one of the edges of the first and second rotor position signals of any phase is detected. Subsequently, the control unit 22 calculates a period that corresponds to 60 degrees in electric angle and the rotation speed of the motor (or the rotor) from the counted value of the counter B and starts the counter 3 again at S5. The control unit 22 also calculates the phase shift of the first rotor position signal from the counted value of the counter Au and the rotation speed of the motor 3.

Then, the control unit 22 examines whether the rotation speed of the motor 3 is between 500 rpm and 2000 rpm at S7, whether the duty ratio of the PWM signal of the inverter 4 is not less than 10% or not at S8, and whether the phase shift calculated at S6 is between 50 degrees and 90 degrees or not at S9. In other words, the steps S7, S8 are to examine whether the rotor position data provided by the second position detecting circuit 28 can be utilized or not, and the step S9 is to examine whether the phase shift data provided by the second position detecting circuit 28 is utilized or not.

If all the results of the examinations at S7, S8 and S9 are YES, a correction value for the phase shift, which is calculated at S6, is calculated at S10. If, on the other hand, any one of the results at the steps S7, S8 and S9 is NO, a correction value is calculated by using a correction map at S11, where a correction value=90 degrees—an angle of the phase shift.

Figures 6F, 6G:
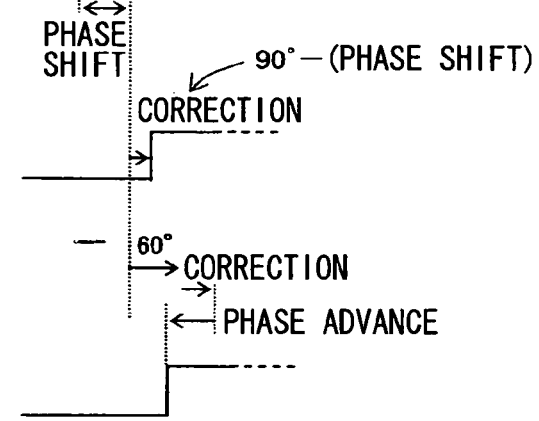

Thereafter, a correction of the turn-on timing is carried out at S12, where the correction value and 60 degrees (or an angle that is n times as many as 60 degrees) in electric angle are added to the phase angle of the rising edge of the U-phase rotor position signal outputted by the first rotor position circuit 27 to provide an OFF timing of the U-phase upper arm (the gate of MOSFET 5a) and an ON timing of the V-phase upper arm (the gate of MOSFET 5b), as shown in FIG. 6F. Incidentally, if the turn-on timing is advanced by a certain angle, this angle is subtracted from the timing after correction, as shown in FIG. 6G.

In the case of turn-on every 120-degree electric angle, the timing is corrected as follows:

U-phase signal rises up→the U-phase upper arm is turned off, and the V-phase upper arm is turned on;

U-phase signal falls down→the V-phase lower arm is turned on, and the U-phase lower arm is turned off;

V-phase signal rises up→W-phase upper arm is turned on, and V-phase upper arm is turned off; and V-phase signal falls down→W-phase lower arm is turned on and V-phase lower arm is turned off;

W-phase signal rises up→W-phase upper arm is turned off, and U-phase upper arm is turned on; and V-phase signal falls down→W-phase lower arm is turned off and U-phase upper arm is turned on.

If the correction value that is calculated by using the correction map at S11 is a positive number and is shorter than a time to calculate the correction value, it is not necessary to add the electric angle of 60 degrees to the correction value at S12 in case the turn-on timing is not advanced. That is, the turn-on signal shown in FIG. 6F should be applied. In this case, the above correction value is added to the rising edge of the output signal of the first rotor position circuit to provide the turn-on timing of the W-phase lower arm and the turn-off timing of the V-phase lower arm. Usually, the phase shift advances by an electric angle of 90 degrees when the current supply increases, and it is possible and more preferable to omit addition of the electric angle of 60 degree.

In this case, the turn-on timings are as follows:

U-phase signal rises up→W-phase lower arm is turned on, and V-phase lower arm is turned off;

U-phase signal falls down→W-phase upper arm is turned on, and V-phase upper arm is turned off;

V-phase signal rises up→U-phase lower arm is turned on, and W-phase lower arm is turned off; and V-phase signal falls down→U-phase upper arm is turned on and W-phase upper arm is turned off;

W-phase signal rises up→V-phase lower arm is turned on, and U-phase lower arm is turned off, and V-phase signal falls down→V-phase upper arm is turned on, and U-phase upper arm is turned off.

A brushless DC motor driving system according to the second embodiment of the invention will be described with reference to FIG. 5 and FIGS. 8A-8D.

Figure 5:
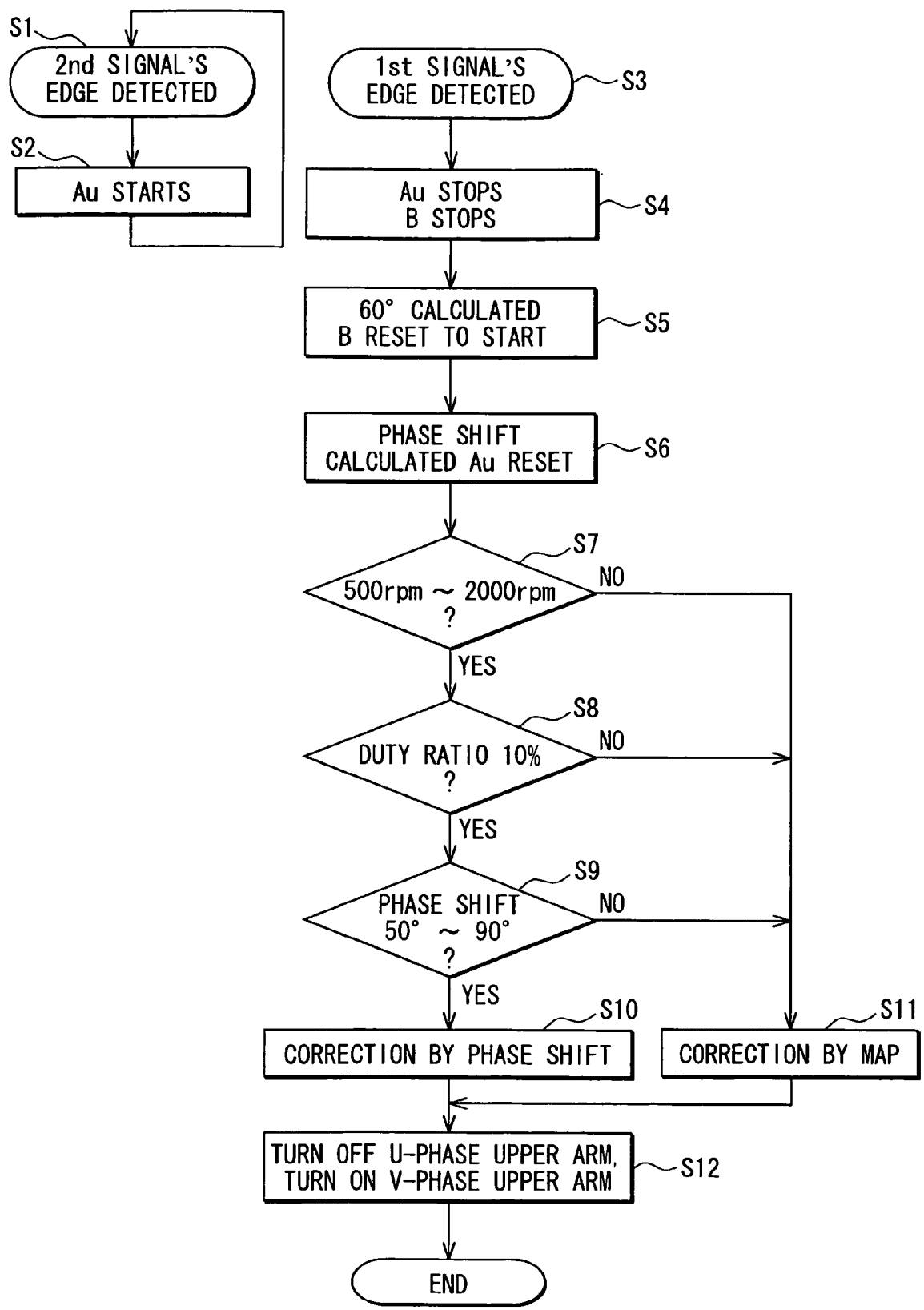
FIG. 5 is a flow diagram for forming turn-on and turn-off signals according to the rising edge of a U-phase rotor position signal.

In stead of step S7 shown in FIG. 5 where the maximum rotation speed is fixed to 2000 rpm, the maximum speed is changed according to the current detected by the current detecting circuit 25.

If the number of magnetic poles of the three-phase motor 3 is ten (10), the maximum rotation speed $N_{max}$ can be expressed as follows.

$N_{max}=(60/t\ mask)\times(2/10)\times(30\ degrees/360\ degrees)$, where $t_{mask}$ is a masking time.

Figure 8A:
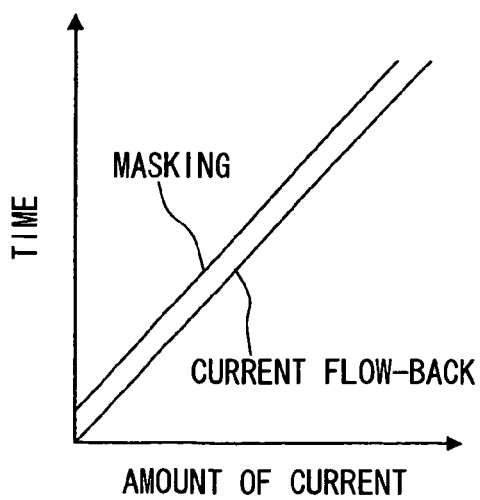
FIGS. 8A and 8B are graphs showing operation of the brushless DC motor according to the second embodiment of the invention.
Figure 8B:
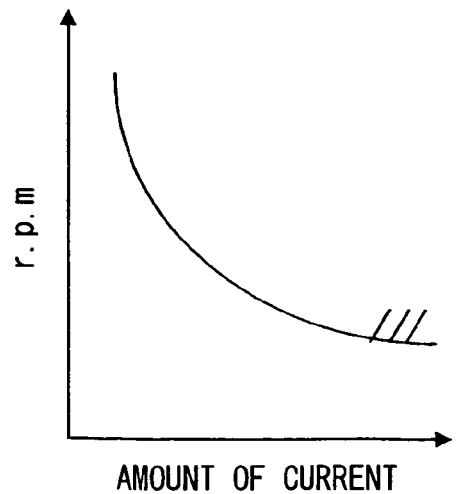

As shown in FIGS. 8A and 8B, the back-flow period and the maximum rotation speed $N_{max}$ increase linearly as the amount of the current increases. Accordingly, the control unit 22 sets the maximum rotation speed $N_{max}$ as shown in FIG. 8B, so that the operation speed range of the motor 3 can be made wider.

Figure 9:
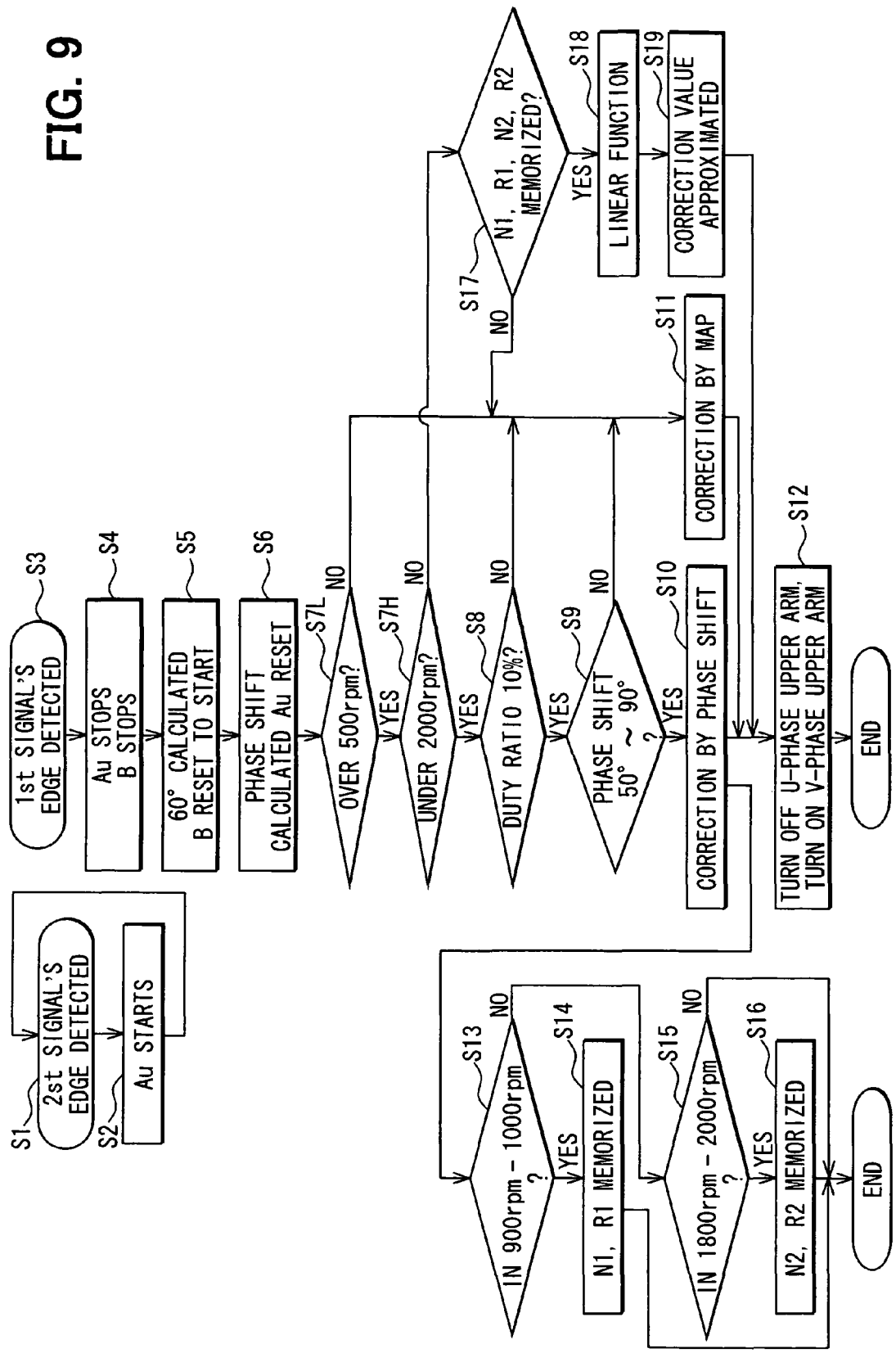
FIG. 9 is a flow diagram of a process forming a turn-on signal from the first and second rotor position signals of a brushless DC motor driving system according to the third embodiment of the invention.

A brushless DC motor driving system according to the third embodiment of the invention will be described with reference to FIG. 9.

This embodiment is almost the same as the first embodiment except for the operation of the control unit 22. That is, the step S7 of the first embodiment shown in FIG. 5 is replaced by steps S7L and S7H in this embodiment, as shown in FIG. 9. Whether the rotation speed is 500 rpm or more is examined at S7L, and whether the rotation speed is 2000 rpm or less is examined at S7H. If both of the examination results are YES, the steps S8-S12 of the first embodiment are subsequently carried out. If, on the other hand, any one of the examination results is NO, the steps S11, S12 of the first embodiment are subsequently carried out. After the step S10, the steps S13-S16 are parallelly carried out. Incidentally, the above steps may be carried out before the step S12. In more detail, whether the rotation speed is between 900 rpm and 1,000 rpm or not is examined at S13, and a rotation speed N1 and a correction value R1 are memorized at S14 if the examination result at S13 is YES. If this result is NO, whether the rotation speed is between 1,800 rpm and 2,000 rpm or not is examined at S15, and a rotation speed N2 and a correction value R2 are memorized at S6 if the examination result at S15 is YES. If both the results of the examinations at S13 and S16 are NO, either the rotation speed or the correction value is not memorized.

Thereafter, if it is judged that the rotation speed is exceeds 2000 rpm at S7H (NO), whether the data of the rotation speed and the correction values N1, R1, N2 and R2 are memorized or not is examined at S17. If the result of this examination is NO, the same correction as the correction according to the first embodiment is made by using a map at S11. If, on the other hand, the result of this examination at S7H is YES, the control unit 22 calculates a linear function of the data N1, R1, N2, R2 forming a map on a two-dimensional coordinate at S18. After the control unit 22 calculates an approximate correction value when the rotation speed exceeds 2000 rpm from the linear function at S19, the step goes to S12.

Figure 10:
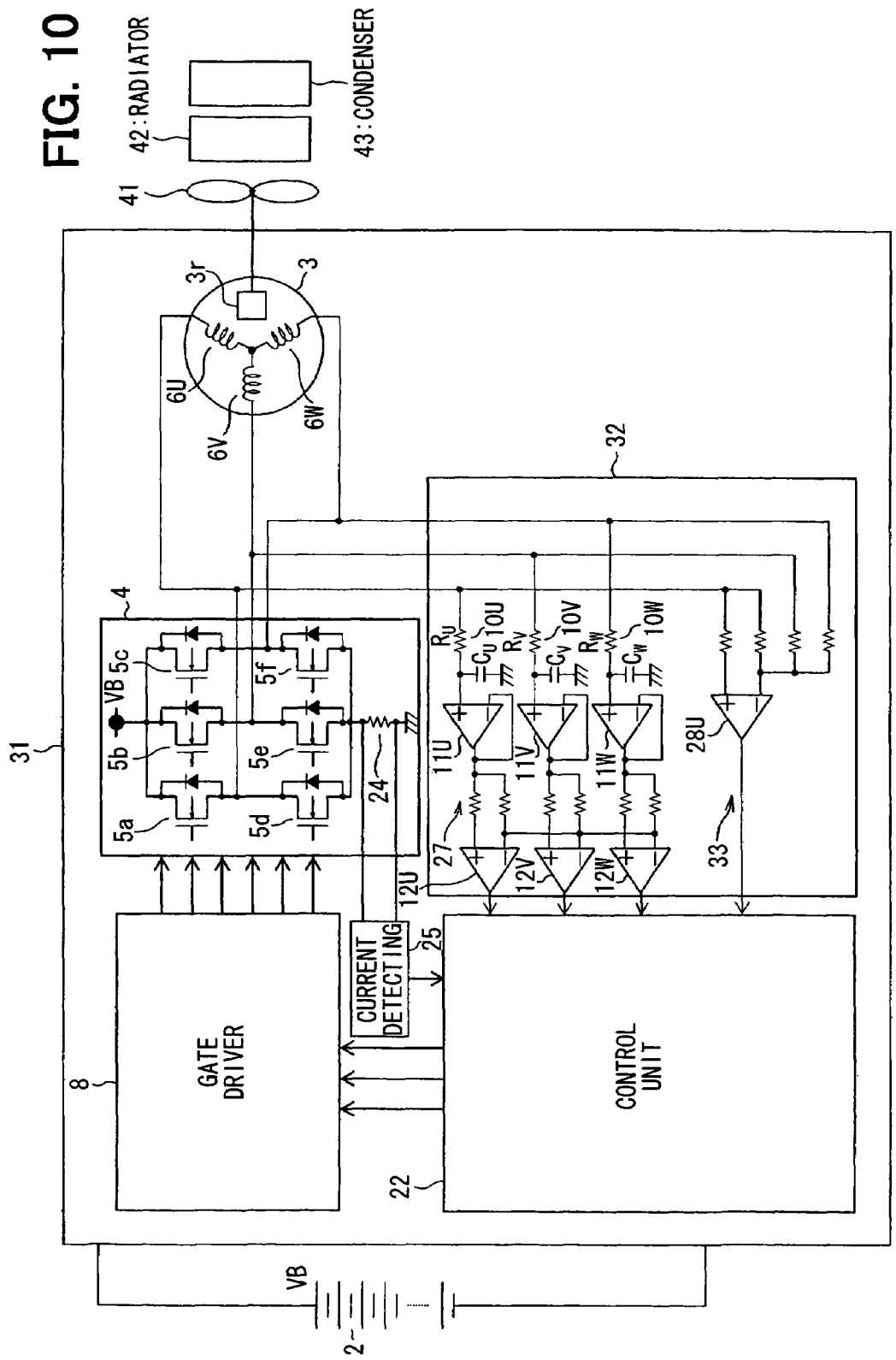
FIG. 10 is a circuit diagram of a brushless DC motor driving system according to the fourth embodiment of the invention.

A brushless DC motor driving system 31 according to the fourth embodiment of the invention will be described with reference to FIG. 10.

The rotor position detecting circuit 23 of the first embodiment is replaced with another rotor position detecting circuit 32, which includes a second position detecting circuit 33 instead of the second position detecting circuit 28, which has a single U-phase comparator 28U. The control unit 22 forms the second rotor position signals from the output signal of the U-phase comparator 28U.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

For example: one of the steps S8 and S9 can be omitted; the current detecting circuit 25 may use a current transformer to detects the amount of current flowing through the stator coil 6; the buffer amplifiers 11U, 11V, 11W can be omitted, and the comparators 12U, 12V, 12W of the second position detecting circuit 28 may compare the phase signals with a half of the battery voltage; and the load of the motor 3 may be different from the cooling fan 41.

Accordingly, the description of the present invention is to be regarded in an illustrative, rather than a restrictive, sense.

What is claimed is:

1. A rotor position detecting circuit for detecting the rotor position of a brushless DC motor having a plurality of phase coils, the rotor position detecting circuit comprising:
   first means for detecting phase voltage induced in one of the phase coils;
   a first position detecting circuit including a low-pass filter connected to the means for detecting voltage and a first comparator that compares the output voltage of the low-pass filter with a threshold level to form a first rotor position signal; and
   a second position detecting circuit including a second comparator that compares the phase voltage with a threshold voltage and second means for digitally processing the output voltage of the second comparator to form a second rotor position signal; and
   third means for correcting the first rotor position signal by the second rotor position signal to provide a final rotor position when the rotation speed of the brushless DC motor is in a measurable range.

2. A rotor position detecting circuit as in claim 1, wherein:
   the third means comprises a correction map that stores correction values each of which corresponds to a rotation speed of the brushless DC motor; and
   the third means corrects the first position signal by one of the correction value stored in the correction map instead of the second rotor position signal when the rotation speed of the brushless DC motor is not in the measurable range.

3. A rotor position detecting circuit as in claim 2, wherein:
   the third means corrects the first position signal by one of the correction value stored in the correction map when the rotation speed of the brushless DC motor is not between an upper limit of the measurable range and a lower limit of the measurable range.

4. A rotor position detecting circuit as in claim 1, wherein the third means forms an approximation based on the second rotor position signal and corrects the first position signal by one of the correction value calculated from the approximation when the rotation speed of the brushless DC motor is not in the measurable range.

5. A rotor position detecting circuit as in claim 1 further comprising fourth means for detecting an amount of current flowing through at least one of the phase coils, wherein the third means sets the measurable range based on the amount of current.

6. A rotor position detecting circuit as in claim 1, wherein the second position detecting circuit includes a plurality of comparators each of which is connected with one of the phase coils.

7. A brushless DC motor driving system comprising:
   the rotation position detecting circuit claimed in claim 1; and
   a motor driving circuit that drives the brushless DC motor at timings provided by the rotation position detecting circuit.

8. A brushless DC motor driving system as in claim 7, wherein the third means comprises;
   phase shift calculating means for calculating a phase shift between the first rotor position signal and the second rotor position signal; and
   turn-on timing setting means for setting a turn-on timing of the motor driving circuit based on a phase of the first rotor position signal.

9. A brushless DC motor driving system as in claim 8, wherein:
   the motor driving circuit comprises an inverter connected to the brushless DC motor and a gate driver that drives the inverter;
   the third means comprises a correction map that stores correction values each of which corresponds to a rotation speed of the brushless DC motor; and
   the turn-on timing setting means sets the turn-on timing based on one of the correction values when the rotation speed of the brushless DC motor is not in the measurable range.

10. A brushless DC motor driving system as in claim 9, wherein:
   the turn-on timing setting means adds as n times as many electric angles of 60 degrees to the one of the correction values to set the turn-on timing; and
   n is a natural number.

11. A brushless DC motor driving system as in claim 9, further comprising fourth means for detecting an amount of current flowing through at least one of the phase coils, wherein the third means sets the measurable range based on the amount of current.

12. A brushless DC motor driving system as in claim 8, wherein:
   the turn-on timing setting means adds as n times as many electric angles of 60 degrees to the phase of the first rotor position signal to set the turn-on timing; and
   n is a natural number.

13. A brushless DC motor driving system as in claim 7, wherein the motor driving circuit drives the brushless DC motor that drives a cooling fan.

14. A method of driving a brushless DC motor having a plurality of phase coils and a rotor, the method comprising:
   picking up phase voltage induced in one of the phase coils;
   passing the phase voltage through a low-pass filter to provide a wave-shaped phase signal;
   comparing the wave-shaped signal with a threshold level to provide a first rotor position signal;
   directly comparing the phase voltage with a threshold level to have an output signal;

digitally processing the output signal to provide a second rotor position signal; and correcting the first rotor position signal by the second rotor position signal to provide a final rotor position signal when the rotation speed of the motor is in a measurable range.

15. A method as in claim 14, further comprising supplying PWM control signals to the phase coils of the brushless DC motor and storing correction values each of which corresponds to a rotation speed of the brushless DC motor, wherein the first rotor position is corrected by one of the correction values when the rotation speed of the motor is not in the measurable range.

16. A method as in claim 14, further comprising supplying PWM control signals to the phase coils of the brushless DC motor and forming an approximation based on the second rotor position signal, wherein the first rotor position is corrected by a correction value calculated from the approximation when the rotation speed of the motor is not in the measurable range.

17. A method as in claim 14, wherein the measurable range is set based on an amount of current flowing through at least one of the phase coils.

* * * * *